(12) United States Patent
Nakagawa

(10) Patent No.: US 11,099,457 B2
(45) Date of Patent: Aug. 24, 2021

(54) OPTICAL COMPONENT HOLDING DEVICE AND IMAGING APPARATUS THEREOF

(71) Applicant: CANON KABUSHIKI KAISHA, Tokyo (JP)

(72) Inventor: Yusuke Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 16/355,587

(22) Filed: Mar. 15, 2019

(65) Prior Publication Data
US 2019/0294030 A1    Sep. 26, 2019

(30) Foreign Application Priority Data
Mar. 23, 2018  (JP) .............................. JP2018-056925

(51) Int. Cl.
| G02B 15/14 | (2006.01) |
| G03B 13/06 | (2021.01) |
| G02B 7/02  | (2021.01) |

(52) U.S. Cl.
CPC ............. *G03B 13/06* (2013.01); *G02B 7/022* (2013.01)

(58) Field of Classification Search
CPC ........... G03B 13/06; G02B 7/022; G02B 7/08
USPC ......................................................... 359/703
See application file for complete search history.

(56) References Cited

U.S. PATENT DOCUMENTS

2013/0077184 A1* 3/2013 Osaka ..................... G02B 7/08
359/824

FOREIGN PATENT DOCUMENTS

| CN | 1658000 A    | 8/2005  |
| CN | 106233199 A  | 12/2016 |
| JP | 2001066690 A | 3/2001  |
| JP | 2002090852 A | 3/2002  |
| JP | 2015-102821 A | 6/2015 |

* cited by examiner

*Primary Examiner* — James C. Jones
(74) *Attorney, Agent, or Firm* — Canon U.S.A., Inc. I.P. Division

(57) ABSTRACT

An holding device can hold an optical component and a masking component with high precision in a simple configuration and a limited space. A first holding member includes a first receiving face that is in contact with a first optical component in an optical axis direction to fix a position of the first optical component in the optical axis direction and a second receiving face that is in contact with a second optical component in the optical axis direction to fix a position of the second optical component in the optical axis direction.

11 Claims, 18 Drawing Sheets

OPTICAL COMPONENT HOLDING DEVICE AND IMAGING APPARATUS THEREOF

BACKGROUND OF THE INVENTION

Field of the Invention

The present disclosure relates to an optical component holding device for holding an optical component. Particularly, the present disclosure relates to an optical component holding device used for an imaging apparatus such a digital camera configured to capture a still image or a moving image, which captures and converts an object image into an electric signal

Description of the Related Art

An imaging apparatus receives an imaging light flux with an image sensor, converts a photoelectric conversion signal output from the image sensor into image data, and stores the image data in a storage medium such as a memory card.

A charge coupled device (CCD) sensor or a complementary metal oxide semiconductor (CMOS) sensor is used as the image sensor.

The above-described imaging apparatus is provided, for example, with a finder device which allows a user to observe an object image and a focus detection device for adjusting a focal point of an object image.

The finder device and the focus detection device are optical units configured of one or more optical components, and these optical components or masking components for setting a necessary light flux have to be attached thereto with high precision.

Particularly, as to an electronic viewfinder, a mainstream configuration is one in which a plurality of optical components and masking components are stacked on a single optical component holding member. Because space for arranging the components is limited, the components have to be attached thereto with high precision.

Conventionally, a configuration illustrated in FIG. 17 is one example of a holding method of the optical components. FIG. 17 is a diagram illustrating a configuration of components of an optical unit 300 in the conventional example.

In the conventional example, optical components 301 to 303, masking components 304 and 305, and an elastic member 308 are housed within a first optical component holding member 306. The optical unit 300 is completed by covering the housed components and members with a second optical component holding member 307.

FIG. 18 is a front view of the first optical component holding member 306, which illustrates receiving faces 311a to 311c for receiving the optical component 301 in an optical axis direction.

The optical component 301 is assembled on these receiving faces 311a to 311c.

On the other hand, receiving faces for receiving the optical components 302 and 303 in the optical axis direction are provided on the masking components 304 and 305 arranged under the respective optical components 302 and 303.

In FIG. 17, the receiving faces for receiving the optical component 302 in the optical axis direction are receiving faces 312a to 312c of the masking component 304, and the receiving faces for receiving the optical component 303 in the optical axis direction are receiving faces 313a to 313c of the masking component 305.

Further, the receiving faces for receiving the respective masking components 304 and 305 in the optical axis direction are provided on the optical components 301 and 302 respectively arranged under the masking components 304 and 305.

In FIG. 17, receiving faces for receiving the masking component 304 in the optical axis direction are receiving faces 314a to 314c of the optical component 301, and the receiving faces for receiving the masking component 305 in the optical axis direction are receiving faces 315a to 315c of the optical component 302.

Accordingly, in the conventional example, the receiving faces 311a to 311c for receiving the optical component 301 are provided on the first optical component holding member 306.

However, the receiving faces for receiving the optical components 302 and 303 are respectively provided on the masking components 304 and 305.

In addition, the receiving faces for receiving the masking components 304 and 305 are respectively provided on the optical components 301 and 302.

Further, as another example of the holding method of the optical components, there is provided a method described below.

With respect to a finder device configured to hold optical components without using adhesives, Japanese Patent Application Laid-Open No. 2015-102821 discusses a method for pressing and holding an optical component in an optical axis direction and a direction vertical to the optical axis by using urging members having elasticity.

However, in the above-described conventional example described in Japanese Patent Application Laid-Open No. 2015-102821, because a large number of pressing/holding members should be used with respect to a single optical component, it will be difficult to highly precisely attach the optical components to a limited space.

Further, in a case where an optical component highly sensitive to parallelism or eccentricity is used, there is a possibility that a desired optical performance cannot be achieved if a surface accuracy of the optical component is considerably distorted.

Further, in the above-described conventional example of FIGS. 17 and 18, a plurality of optical components and masking components is stacked on a single optical component holding member.

Therefore, in order to execute distance correction or inclination correction of the optical components 301 to 303 in the optical axis direction, receiving faces of the plurality of optical components and masking components have to be corrected, so that it will be difficult to hold the optical components with high precision in the mass production.

In a case where a finder performance is to be improved in the conventional exemplary embodiment, holding the optical components with high precision in the mass production becomes increasingly difficult if sensitivity of the lens is taken into consideration.

SUMMARY OF THE INVENTION

Therefore, the present disclosure is directed to an optical component holding device configured to highly precisely hold optical components and masking components in a limited space with a simple configuration.

According to an aspect of the present disclosure, an optical component holding device includes a first optical component which holds a lens, a second optical component which holds a lens, a first masking for setting a diameter of a light flux, which is arranged at a position between the first optical component and the second optical component in an optical axis direction, a fist holding member, and a second holding member, wherein the first masking includes a first urging member that is in contact with the first optical component and the second optical component to urge the first optical component and the second optical component in the optical axis direction, wherein the first holding member and the second holding member hold the first optical component, the first masking, and the second optical component in between, and press and hold the first optical component, the second optical component, and the first masking in the optical axis direction, and wherein the first holding member includes a first receiving face that is in contact with the first optical component in the optical axis direction to fix a position of the first optical component in the optical axis direction and a second receiving face that is in contact with the second optical component in the optical axis direction to fix a position of the second optical component in the optical axis direction.

Further features of the present disclosure will become apparent from the following description of exemplary embodiments with reference to the attached drawings.

DESCRIPTION OF THE EMBODIMENTS

As an exemplary embodiment of the present disclosure, a configuration of a camera will be described with reference to the appended drawings.

A camera according to the present exemplary embodiment is applicable to a digital single-lens reflex camera using a solid-state image sensor such as a charge coupled device (CCD) sensor or a complementary metal oxide semiconductor (CMOS) sensor.

Figure 1A:
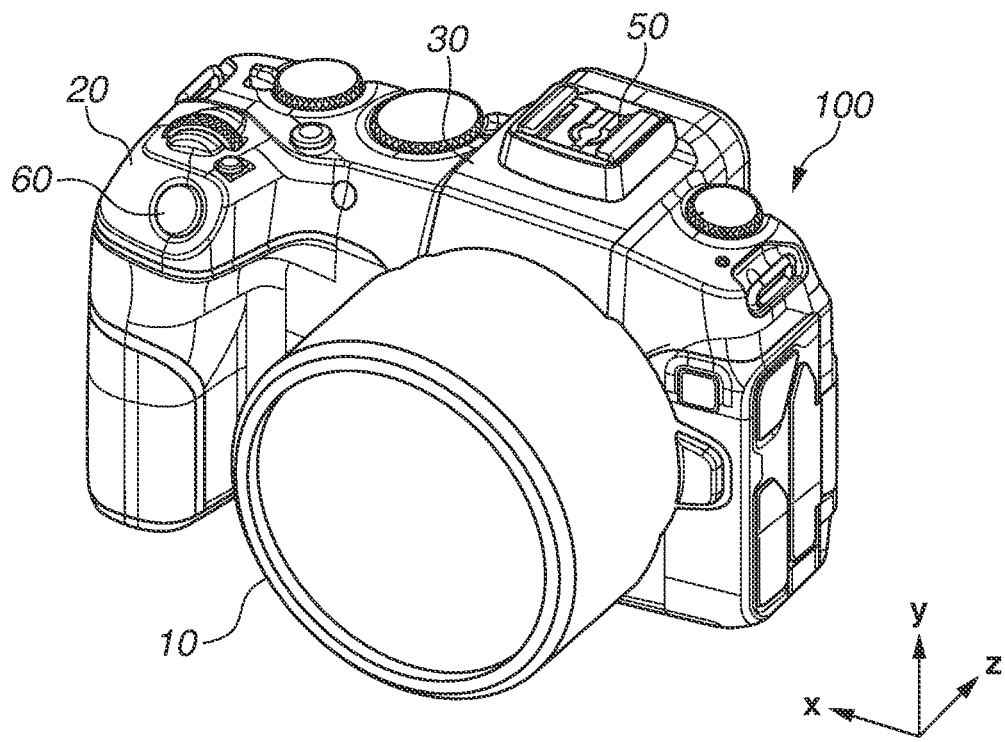
FIGS. 1A and 1B are a front face perspective view and a back face perspective view illustrating a camera according to an exemplary embodiment of the present disclosure.
Figure 1B:
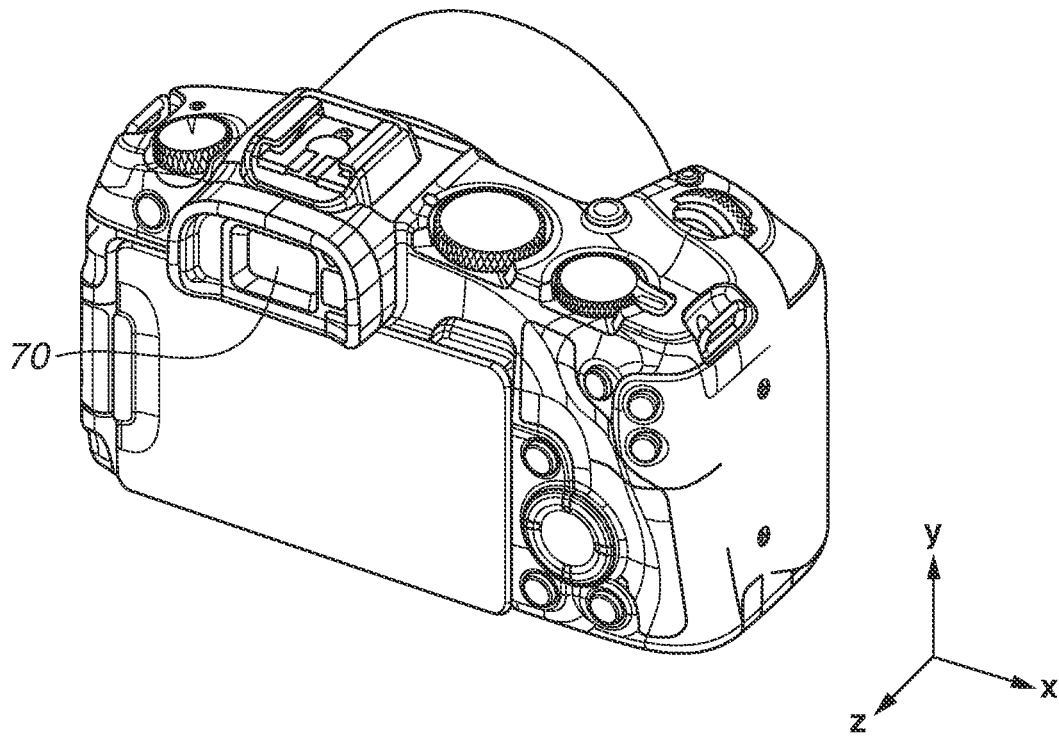

FIGS. 1A and 1B are diagrams illustrating an example of a camera 100 according to an exemplary embodiment of the present disclosure. FIG. 1A is a front face perspective view of the camera 100, and FIG. 1B is a back face perspective view of the camera 100.

An imaging lens 10 is mounted on the camera 100 and electrically connected thereto via a mount contact point group (not illustrated). An upper face cover 20 covers an upper face of the camera 100.

The upper face cover 20 is formed of a conductive member such as conductive resin, so that the camera 100 can be prevented from emitting unnecessary noise, and is less affected by external noise.

An antenna cover 30 covers a wireless module 40. The antenna cover 30 is formed of a non-conductive member such as resin, so that the antenna cover 30 transmits a wireless radio wave and enables the wireless module 40 to communicate with an external apparatus.

An accessory shoe 50 is a portion where an accessory such as a flash device used for imaging is attached to the camera 100.

A user presses and operates an imaging button 60 in order to start imaging operation. A user observes an object image through an electronic viewfinder (hereinafter, referred to as "EVF") 70.

Figure 2:
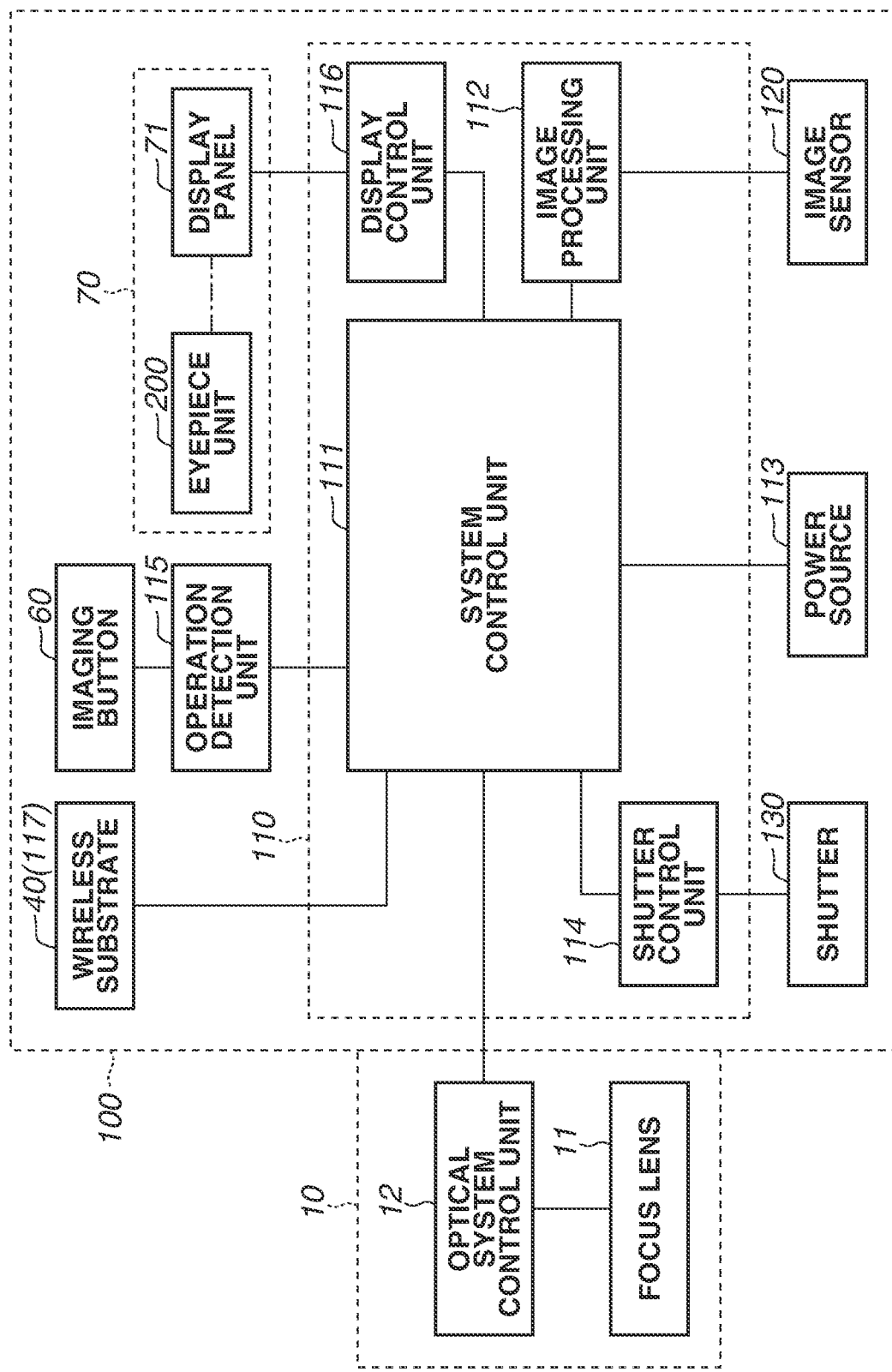
FIG. 2 is a system diagram of the camera according to an exemplary embodiment of the present disclosure.

FIG. 2 is a system diagram of the camera 100 of the present exemplary embodiment of the present disclosure. Various components which constitute a system control unit 111 and an image processing unit 112 described below are mounted on a main substrate 110, and execute operation control of the entire camera 100.

A power source 113 supplies power to each portion of a circuit inside the camera 100.

An image sensor 120 is configured of a CCD sensor or a CMOS sensor. An optical image of an object is acquired and converted into an image signal by the image sensor 120.

The image signal acquired by the image sensor 120 is converted into image data by the image processing unit 112 and output to the system control unit 111.

The imaging lens 10 is configured of a plurality of lenses such as a focus lens 11 and an aperture (not illustrated).

Based on a signal input through the system control unit 111 via the mount contact point group, an optical system control unit 12 drives the focus lens 11 and the aperture to adjust a focal point of the imaging lens 10 and an amount of light incident on the camera 100.

A shutter 130 is arranged at a position between the imaging lens 10 and the image sensor 120, and exposure time of the image sensor 120 is adjusted.

A shutter control unit 114 drives the shutter 130 based on the signal received from the system control unit 111.

When the imaging button 60 is pressed and operated by a user, the operation detection unit 115 outputs a signal to the system control unit 111, so that imaging operation is started.

An eyepiece unit 200 that holds optical components and a display panel 71 such as an organic electroluminescence (EL) panel are mounted on the EVF 70.

The display control unit 116 displays imaging information or an image acquired from the image sensor 120 on the display panel 71 to allow a user to visually recognize the object image through the eyepiece unit 200.

A wireless module 40 is mounted on the wireless substrate 117. The wireless module 40 can transmit a captured image through wireless communication to an external apparatus (e.g., personal computer) connected to the wireless communication network.

Hereinafter, an optical component holding device arranged on a camera as an exemplary embodiment of the present disclosure will be described with reference to the drawings.

<Optical Component>

First, a configuration of the eyepiece unit 200 mounted on the EVF 70 included in the above-described camera 100 according to the exemplary embodiment of the present disclosure will be described with reference to FIGS. 3 and 4.

The eyepiece unit 200 corresponds to the optical component holding device 200 described in the claims.

Figure 3:
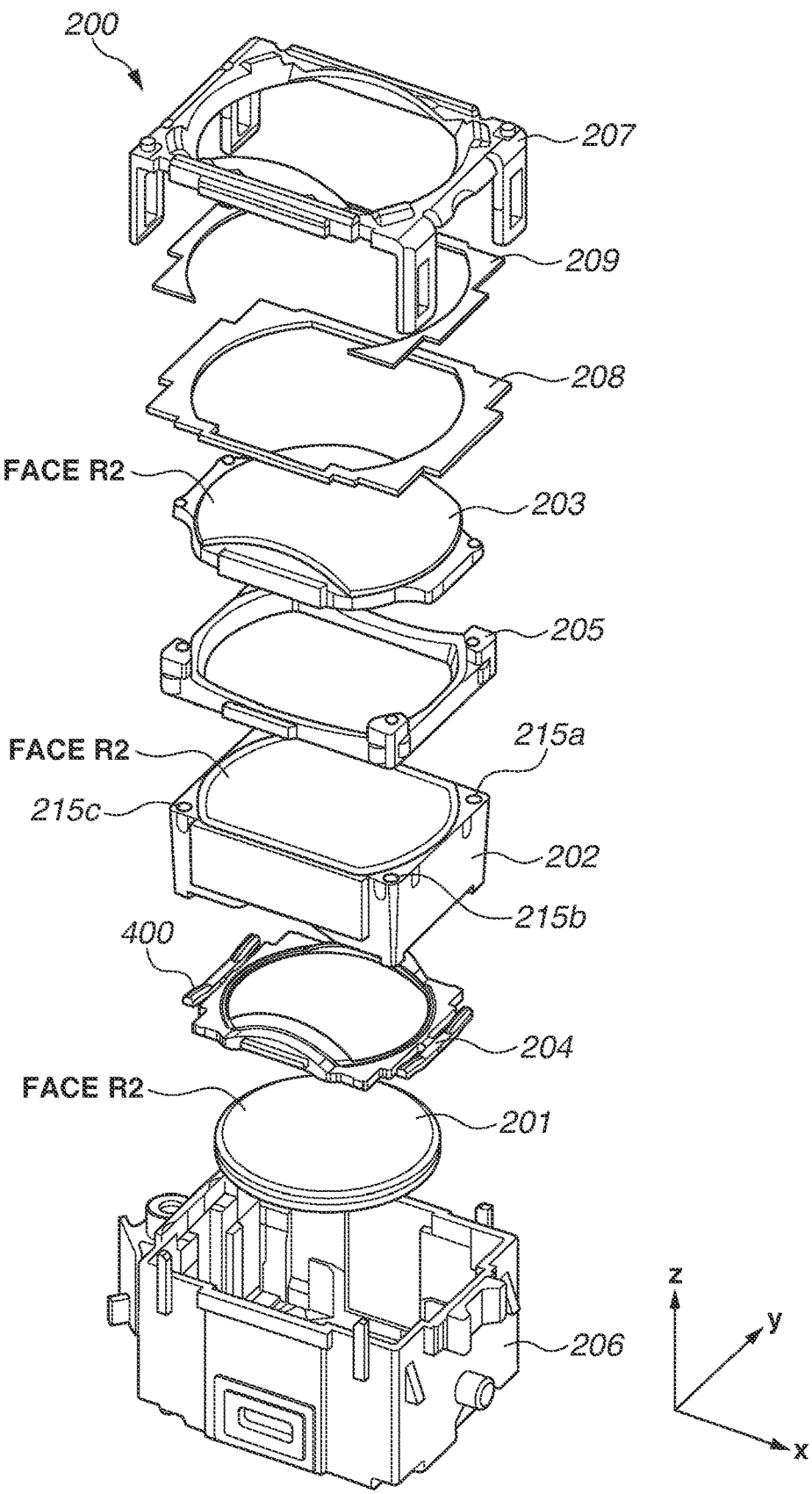
FIG. 3 is a perspective view illustrating an eyepiece unit according to an exemplary embodiment of the present disclosure.

FIG. 3 is a perspective view illustrating the eyepiece unit 200 according to the exemplary embodiment of the present disclosure.

Figure 4:
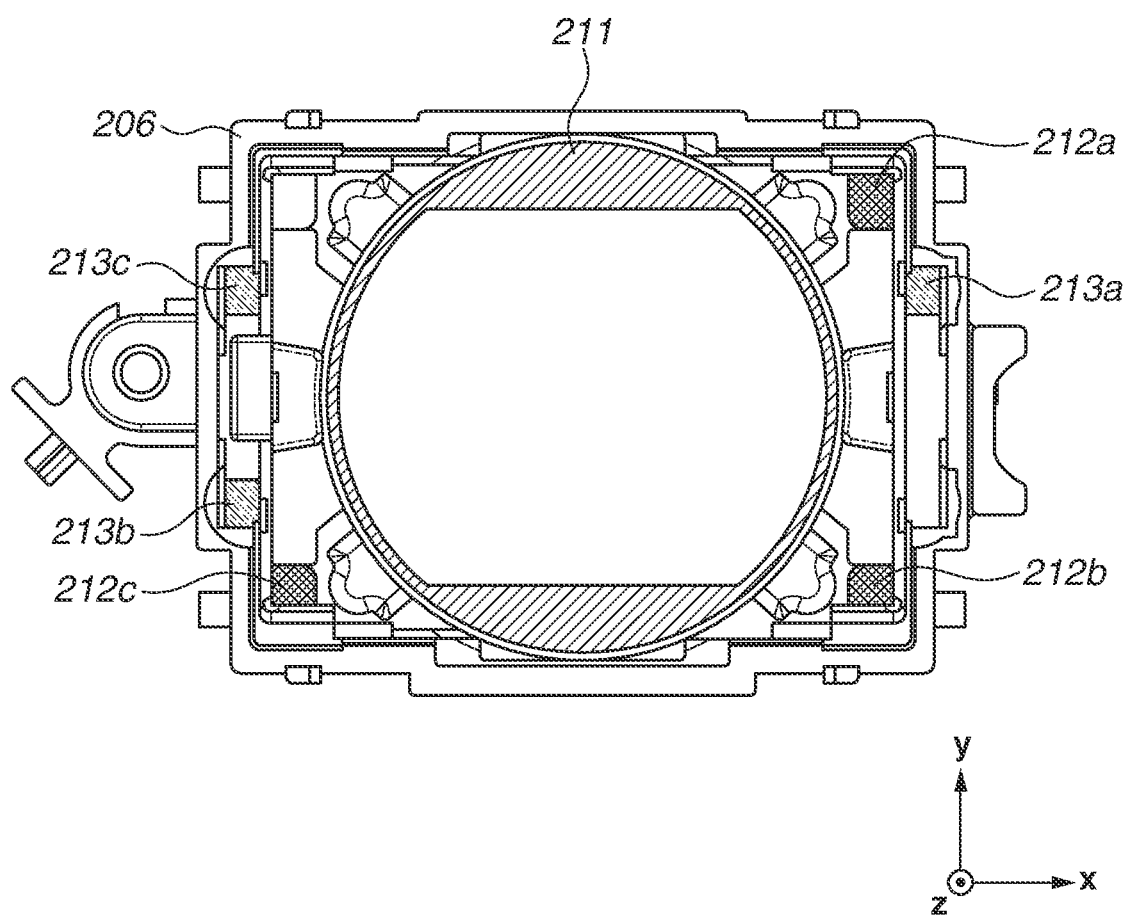
FIG. 4 is a front view illustrating a first optical component holding member according to an exemplary embodiment of the present disclosure.

FIG. 4 is a front view illustrating a first optical component holding member 206 of the exemplary embodiment of the present disclosure.

As illustrated in FIG. 3, the eyepiece unit 200 is configured of optical components 201 to 203, masking components 204 and 205, and the other components housed within the first optical component holding member 206 and the second optical component holding member 207.

A diopter of the object image displayed on the display panel 71 mounted on the EVF 70 can be adjusted by moving the eyepiece unit 200 in a z-axis direction (hereinafter, called as "optical axis direction").

Generally, the optical components 201 to 203 are formed by molding optical resin (e.g., polycarbonate) or optical glass having high transparency.

Each of the optical components 201 to 203 has an approximately rectangular or circular shape. An effective lens face of approximately spherical-shape, i.e., a face R2 illustrated in FIG. 3, is formed at the center of the optical components.

Each of the optical components 201 to 203 is a supporting member in which the outer rim of the effective face of the lens is supported by a supporting portion.

A side opposite to the face R2 of each of the optical components 201 to 203 is similarly formed into an effective lens face of approximately spherical-shape, i.e., a face R1.

Further, the masking components 204 and 205, and the first and the second optical component holding members 206 and 207 are formed by molding resin such as polycarbonate.

The masking components 204 and 205 set a diameter of a light flux.

Each of the masking components 204 and 205 has an opening of approximately rectangular-shape at the center thereof and sets a necessary light flux.

The first optical component holding member 206 is formed into an approximately box shape, and the second optical component holding member 207 is formed into a cover shape, so that the respective components can be housed within the first optical component holding member 206.

The second optical component holding member 207 is configured to engage with the first optical component holding member 206.

FIG. 4 is a front view of the first optical component holding member 206 having faces for receiving the optical components 201 to 203 in the optical axis direction.

These receiving faces are a face 211 for receiving the optical component 201, faces 212a to 212c for receiving the optical component 202, and faces 213a to 213c for receiving the optical component 203.

Therefore, distance correction and inclination correction of the optical components 201 to 203 in the optical axis direction can be executed by correcting the faces for receiving the respective optical components 201 to 203 provided on the first optical component holding member 206, so that the optical components 201 to 203 can be easily held with high precision in the mass production.

Therefore, finder quality such as distortion arising in a finder image or a viewing angle when a user looks into the finder can be stably improved.

Further, an elastic member 208, and a bonding member 209 for making the elastic member 208 adhere to the second optical component holding member 207 are arranged between the optical component 203 and the second optical component holding member 207.

The elastic member 208 is arranged to press the optical components 201 to 203 and the masking components 204 and 205, so that positions of the respective components can be reliably fixed at the appropriate receiving faces.

In the present exemplary embodiment, although the bonding member 209 is arranged in order to perform assembling work easily, the bonding member 209 is not essential.

As described above, the optical components 201 to 203 and the masking components 204 and 205 are housed within the first optical component holding member 206.

Thus, the eyepiece unit 200 is completed by covering the housed components and members with the second optical component holding member 207 to which the elastic member 208 adheres.

The first masking component 204 includes a first urging member 400 that is in contact with the first optical component 201 and the second optical component 202 to urge the first optical component 201 and the second optical component 202 in the optical axis direction.

The first optical component holding member 206 and the second optical component holding member 207 hold the first optical component 201, the first masking component 204, and the second optical component 202 in between, and press and hold the first optical component 201, the first masking component 204, and the second optical component 202 in the optical axis direction.

The first optical component holding member 206 includes a first receiving face that is in contact with the first optical component 201 in the optical direction to fix a position of the first optical component 201 in the optical axis direction and a second receiving face that is in contact with the second optical component 202 in the optical axis direction to fix a position of the second optical component 202 in the optical axis direction.

The third urging member (i.e., elastic member) 208 is arranged at a position between the second optical component holding member 207 and the third optical component 203.

A load caused by the first urging members 400 is smaller than a total value of the weights of the second optical component 202, the third optical component 203, the second masking component 205, and a load caused by the third urging member 208, which are positioned on one side of the first masking component 204 which is opposite to an object (see FIG. 3).

<General Outline of Masking Component and Urging Member>

Next, each component housed in the holding member 206 for holding the first optical component and the holding member 207 for holding the second optical component will be described in detail with reference to FIGS. 5 to 7.

Figure 5A:
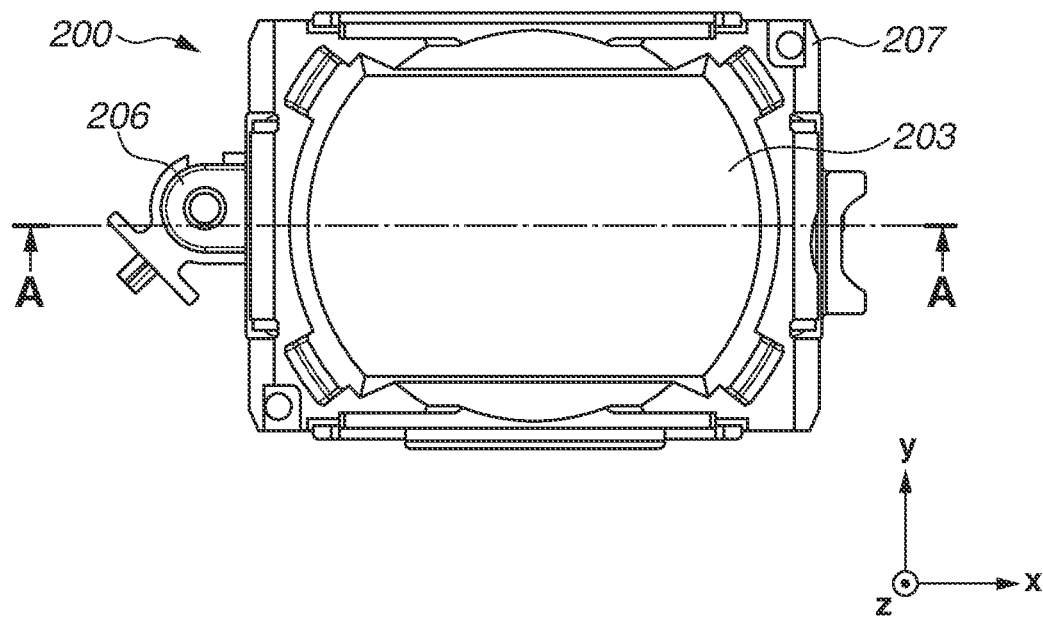
FIGS. 5A and 5B are a front view and a cross-sectional view taken along a line A-A, which illustrate the eyepiece unit according to the present exemplary embodiment of the present disclosure.
Figure 5B:
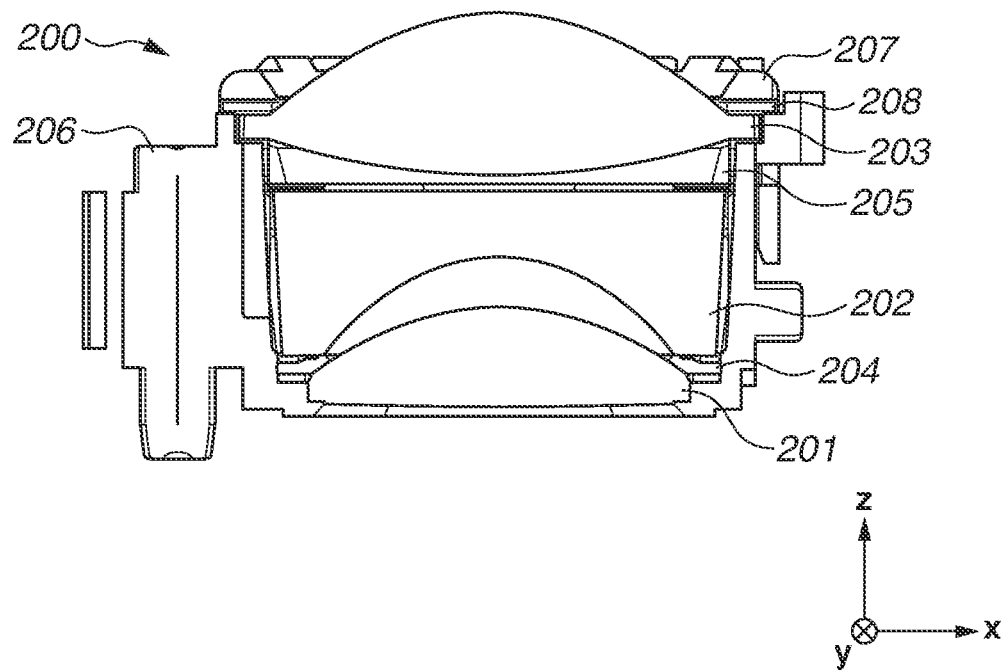

FIG. 5A is a front view illustrating the eyepiece unit 200 of the exemplary embodiment of the present disclosure, and FIG. 5B is a cross-sectional view taken along a line A-A in FIG. 5A.

Figure 6A:
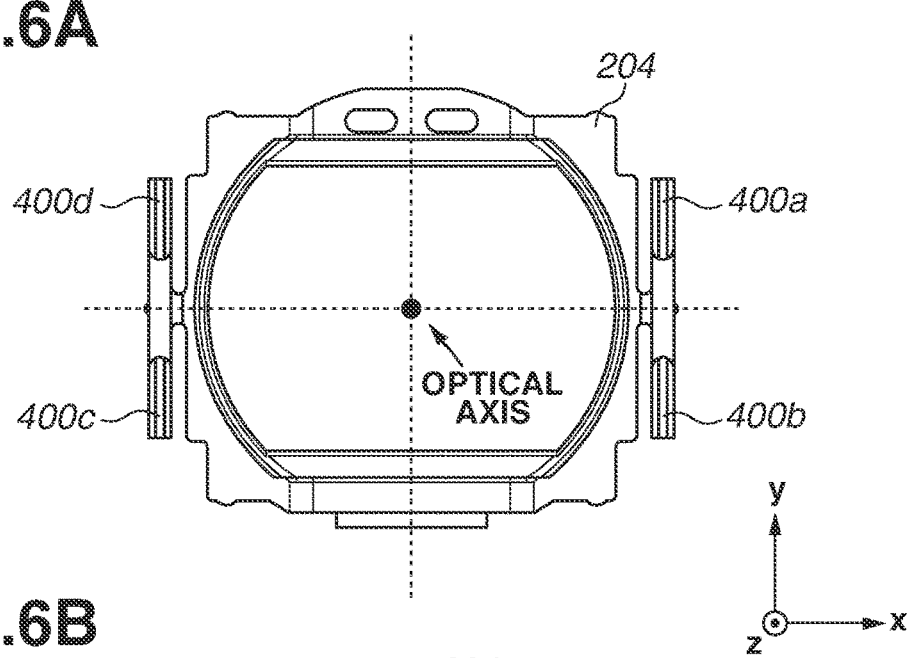
FIGS. 6A, 6B, and 6C are a front view, a back view, and a perspective view illustrating a masking component and an urging member according to an exemplary embodiment of the present disclosure.
Figure 6B:
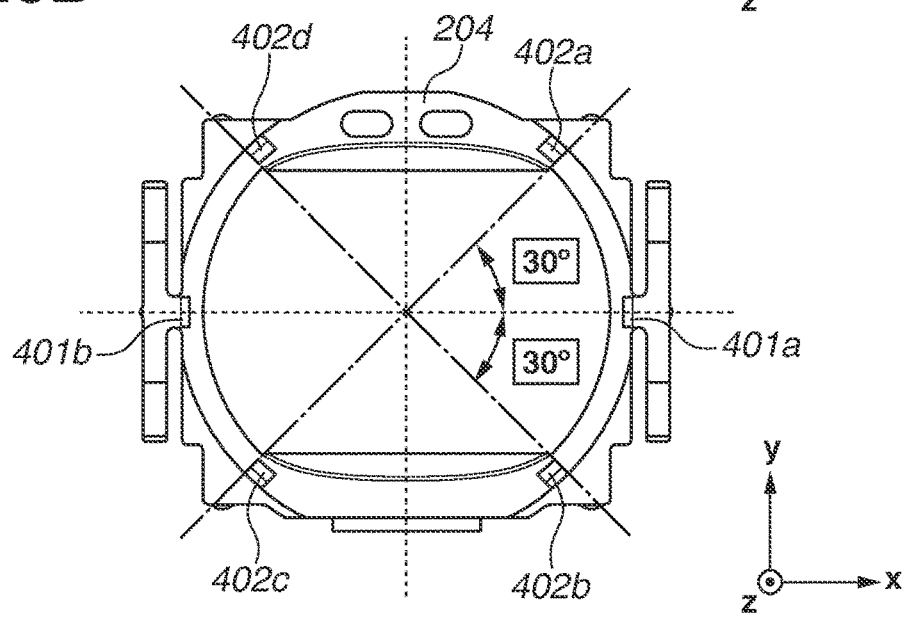
Figure 6C:
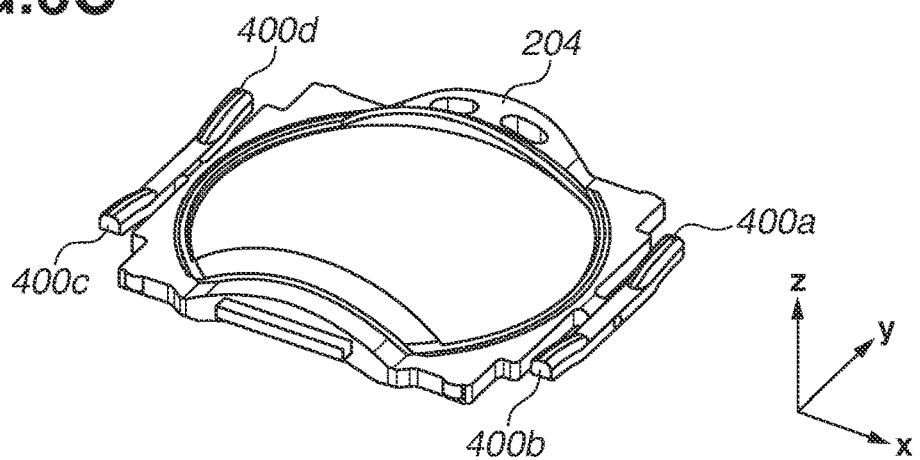

FIG. 6A is a front view illustrating the first masking component 204 and the urging member 400 of the exemplary embodiment of the present disclosure, and FIG. 6B and FIG. 6C are a back view and a perspective view of the first masking component 204 and the urging member 400.

Figure 7:
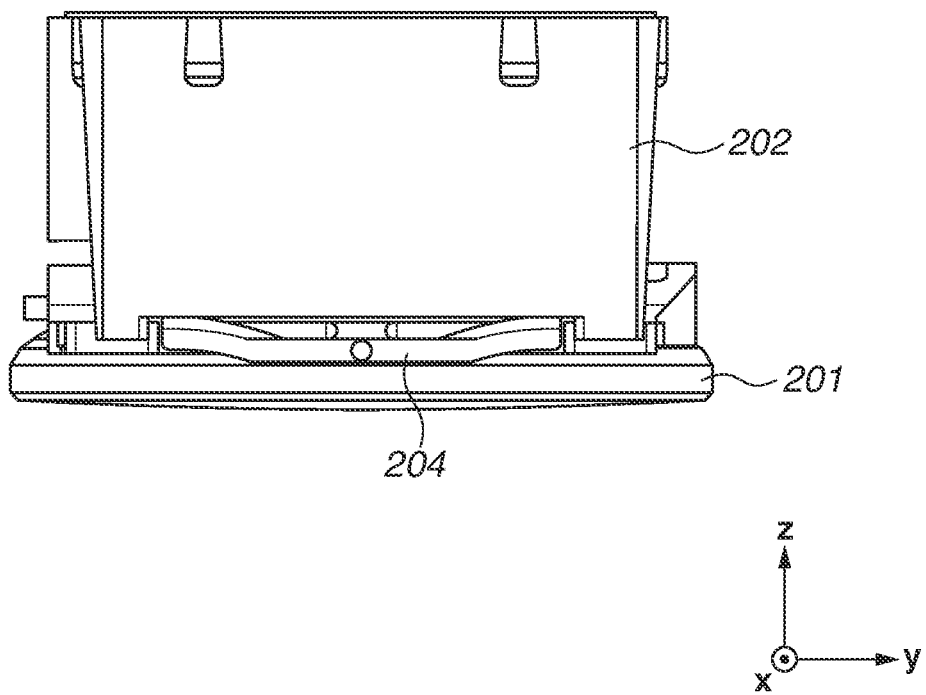
FIG. 7 is a side view illustrating an optical component and a masking component according to an exemplary embodiment of the present disclosure in a housed state.

FIG. 7 is a side view illustrating the optical components 201 and 202, and the masking component 204 according to the exemplary embodiment of the present disclosure in a housed state.

Figure 8A:
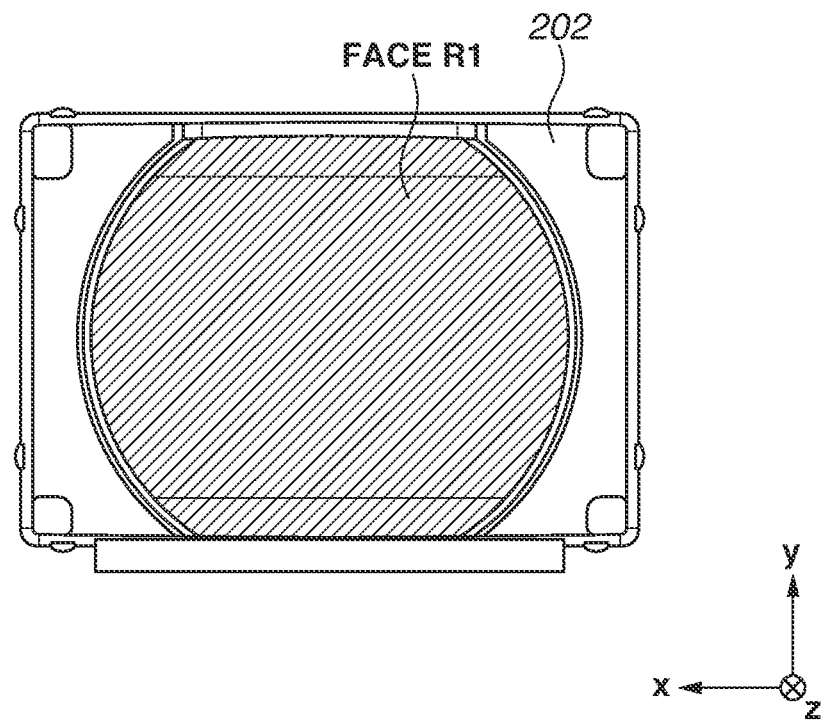
FIGS. 8A and 8B are diagrams illustrating a contact position of an urging member and an optical component according to an exemplary embodiment of the present disclosure.
Figure 8B:
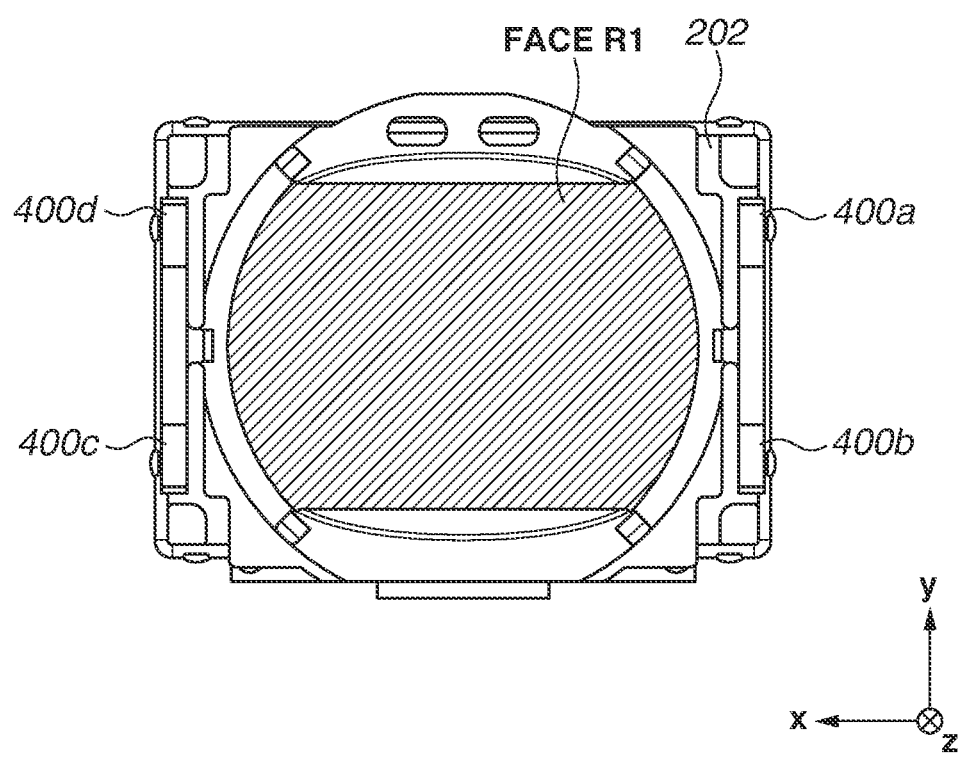

FIGS. 8A and 8B are diagrams illustrating a contact position of the urging member 400 of the masking component 204 and the optical component according to the exemplary embodiment of the present disclosure.

Figure 9:
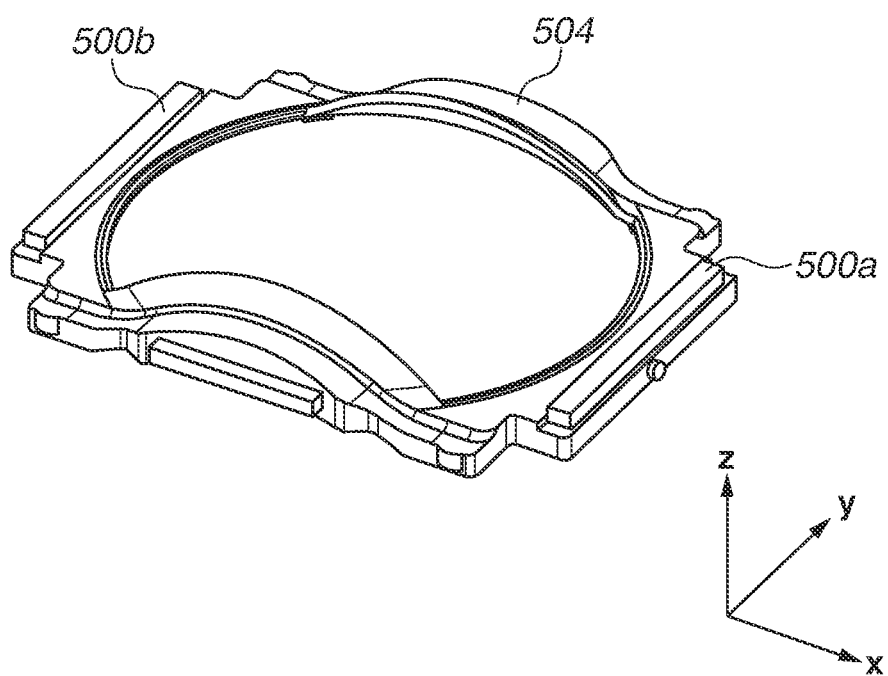
FIG. 9 is a perspective view illustrating a masking component and an urging member according to another exemplary embodiment of the present disclosure.

FIG. 9 is a perspective view illustrating a masking component 504 and an urging member 500 according to another exemplary embodiment of the present disclosure.

Figure 10:
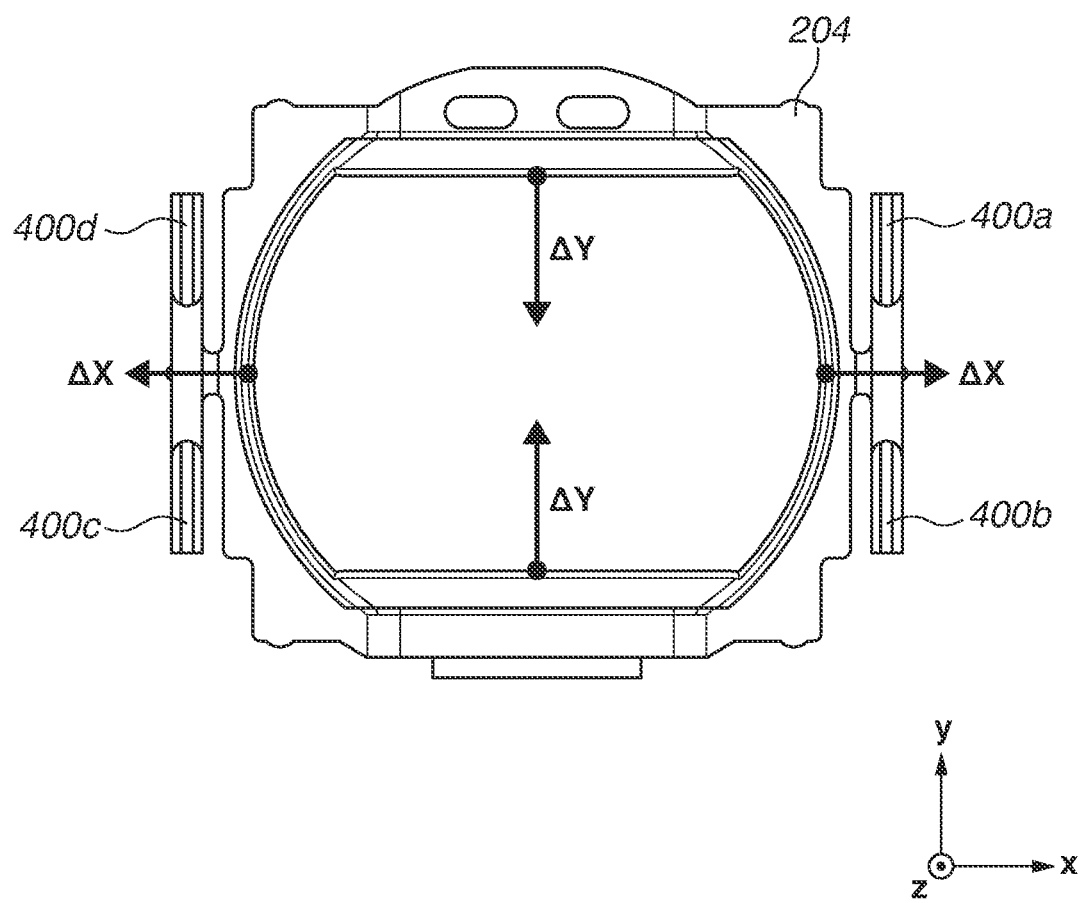
FIG. 10 is a diagram illustrating a deformation direction of an opening portion of a masking component according to an exemplary embodiment of the present disclosure.

FIG. 10 is a diagram illustrating a deformation direction of an opening portion of the masking component 204 according to the exemplary embodiment of the present disclosure.

Figure 11A:
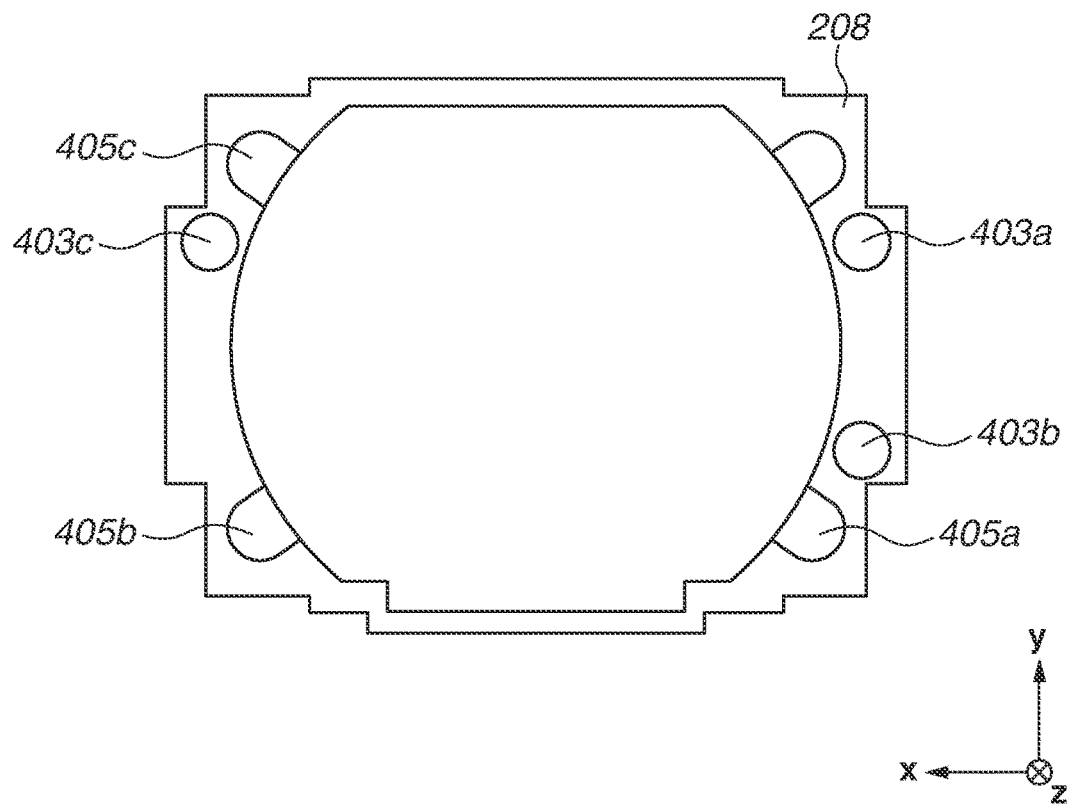
FIGS. 11A and 11B are a back view and a perspective view illustrating an elastic member according to an exemplary embodiment of the present disclosure.
Figure 11B:
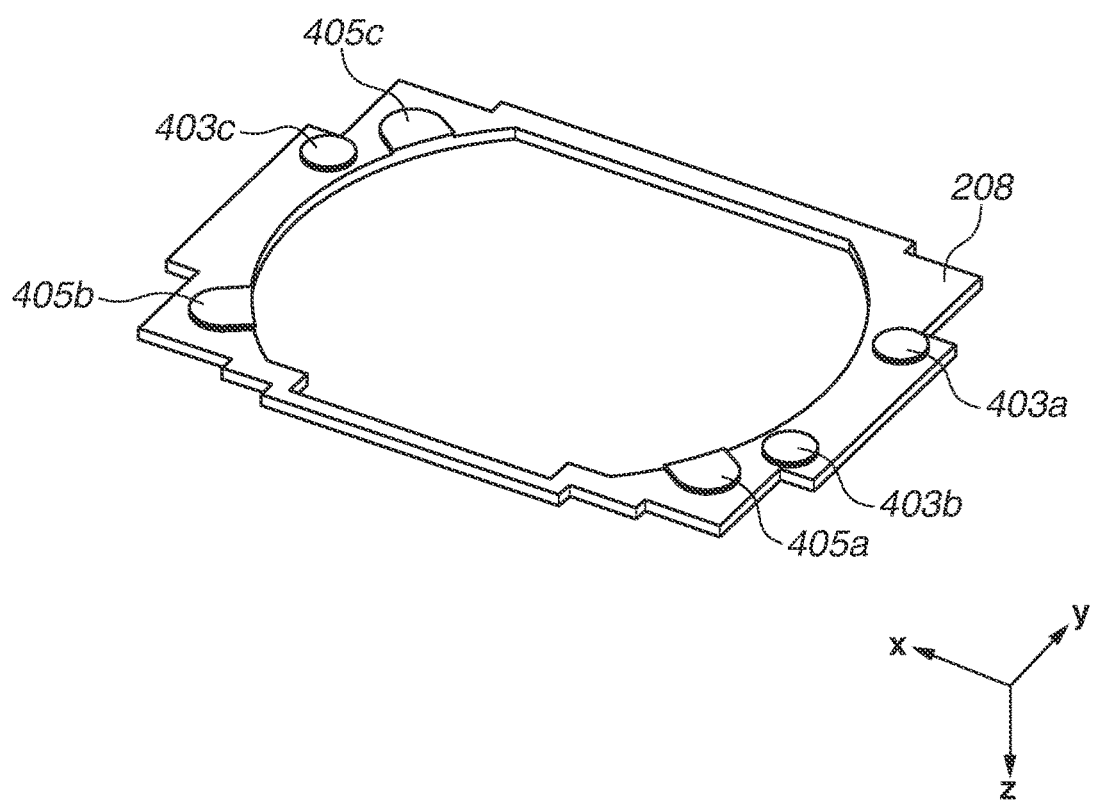

FIGS. 11A and 11B are a back view and a perspective view illustrating the elastic member 208 according to the exemplary embodiment of the present disclosure.

As described above, in a cross-sectional view in FIG. 5B taken along the line A-A in FIG. 5A, the optical components 201 to 203 are assembled on the receiving faces provided on the first optical component holding member 206 in the optical axis direction.

Therefore, in the present exemplary embodiment, an issue is how to precisely hold the masking components 204 and 205 while reliably fixing the positions of the optical components 201 to 203 in the optical axis.

First, a holding method of the first masking component 204 will be described in detail.

As illustrated in FIG. 6A, the first masking component 204 includes approximately rectangular-shaped urging members 400a to 400d extending in the y-direction in FIG. 6A in each quadrant of the coordinate system that takes the optical axis as 0.

Further, as illustrated in FIG. 6B, the masking component 204 and the optical component 201 are in contact with each other at contact portions 401a, 401b, and 402a to 402d.

The receiving face of the masking component 204 in the optical axis direction is the face R2 of the optical component 201, so that the optical component 201 is in contact with the masking component 204 at the receiving faces 401a, 401b, and 402a to 402d illustrated in FIG. 6B.

Each of the first urging members 400 of the first masking component 204 extends in a direction of a shorter side of a field of view of the finder, and the receiving face 401a (401b) at which the first optical component 201 is in contact with the first masking component 204 is provided at a base portion of each first urging member 400 (see FIGS. 6A, 6B and 6C).

The first masking component 204 includes a plurality of receiving faces 402a to 402d contacting the first optical component 201, which are arranged at positions of an angle of 30-degree or more, taking an axis in a direction of a longer side of a field of view of the finder as a reference (see FIGS. 6A, 6B and 6C).

FIG. 7 is a diagram illustrating the masking component 204 in a housed state. The first optical component 201, the first masking component 204, and the optical component 202 are sequentially housed in the first optical component holding member 206. The first optical component holding member 206 is not illustrated in FIG. 7.

In the present exemplary embodiment, the masking component 205, the optical component 203, and the elastic member 208 are further housed on top of the optical component 202.

At this time, the masking component 204 is in contact with the first optical component 201 at the receiving faces 401a, 401b, and 402a to 402d.

On the other hand, the masking component 204 is in contact with the second optical component 202 at the leading ends of the urging members 400a to 400d, so that the masking component 204 is in contact with the two optical components 201 and 202.

In this state, the urging members 400a to 400d of the masking component 204 are elastically deformed by the weights of the optical component 202 and the other components and pressing force of the elastic member 208.

With the elastic force generated in the above state, the masking component 204 is precisely fixed at a position between the optical components 201 and 202.

At this time, each of the optical components 201 and 202 has a thickness and a rigidity of a certain degree or more. Therefore, in comparison to the urging members 400a to 400d, the optical components 201 and 202 are less likely to be elastically deformed.

Therefore, it can be thought that the elastic force generated thereby is extremely small in comparison to the elastic force generated by the urging members 400a to 400d.

Further, as illustrated in FIG. 8B, it is preferable that the urging members 400a to 400d of the masking component 204 be in contact with the second optical component 202 at the positions other than the lens effective face R1 of the optical component 202.

FIG. 8A is a back view of the optical component 202, and a shaded portion represents the lens effective face R1.

If the urging members 400a to 400d are brought into contact with the lens effective face R1, distortion may occur in the lens face of the optical component 202 because of the elastic force, so that finder performance can be negatively affected.

Therefore, as illustrated in FIG. 8B, in the present exemplary embodiment, distortion of the lens face is suppressed by causing the urging members 400a to 400d to contact the optical component 202 at the positions other than the lens effective face R1.

With the above-described configuration, a position of the masking component 204 can be precisely fixed, and distortion of the lens face can be suppressed. Therefore, finder quality such as distortion arising in a finder image or a viewing angle can be stably improved when a user looks into the finder.

In the present exemplary embodiment, the urging members 400a to 400d are formed integrally with the masking component 204. However, as illustrated in FIG. 9, urging members may be formed separately from the masking component 504.

The urging members 500a and 500b in FIG. 9 are elastic members formed of a material such as urethane foam or rubber, for example, and the plurality of urging members 500a and 500b is arranged to extend across the quadrants of the coordinate system which takes the optical axis as a center.

Further, in the present exemplary embodiment, as illustrated in FIG. 6B, the receiving faces 401a and 401b of the masking component 204 having the urging members 400a to 400d, and the optical component 201, in the optical axis direction, are arranged at the base portions from which the urging members 400a to 400d extend.

As illustrated in FIG. 10, in the configuration according to the present disclosure, the masking component 204 is fixed at a position between the optical components 201 and 202. At this time, in a manner similar to that of elastic deformation of the urging members 400a to 400d, an opening shape of the masking component 204 which sets a light flux required for the field of view of the finder is also elastically deformed in a direction indicated by an arrow in FIG. 10.

If the masking opening is deformed in one direction more than expected, for example, deformed in a direction which increases its opening size, a component that is not visible under the normal condition becomes visible.

On the other hand, if the masking opening is deformed in another direction which decreases its opening size, there is an instance that the field of view of the finder is reduced.

In a general finder, a light flux required for the field of view of the finder is wider in the x-direction (lateral width) than in the y-direction (longitudinal width) in FIG. 10, so that a margin in the x-direction is less than a margin in the y-direction due to its structural space.

Accordingly, in the present exemplary embodiment, by arranging the receiving faces 401a and 401b at the base portions of the urging members 400a to 400d, deformation of the masking opening in the x-direction is sufficiently suppressed.

Each of the first masking component 204 and the second masking component 205 has a rectangular-shaped outer circumferential rim.

The first urging members 400a to 400d are arranged on the shorter sides of the rectangular-shaped outer circumferential rim of the first masking component 204.

The second urging members 600a to 600d are arranged on the shorter sides of the rectangular-shaped outer circumferential rim of the second masking component 205.

Further, in a configuration according to the present exemplary embodiment, the masking component 204 is housed in the first optical component holding member 206 and the second optical component holding member 207.

In the above-described state, a relationship between a deformation amount Δx in the x-direction and a deformation amount Δy in the y-direction of the masking opening can be expressed as "Δx<Δy".

Therefore, when a user looks into the finder, a viewing angle and a field of view with less vignetting can be stably ensured.

Further, in the present exemplary embodiment, as the receiving faces of the masking component 204 and the first optical component 201 in the optical axis direction, receiving faces 402a to 402d are provided in addition to the receiving faces 401a and 401b.

Each of the receiving faces 402a to 402d may desirably be arranged at a position of an angle of 30-degree or more from the x-axis in the Figure in the coordinate system that takes the optical axis as 0.

If the receiving faces 402a to 402d are positioned at an angle of 30-degree or less from the x-axis in the Figure, the optical component 201 is received in the periphery of the base portions of the urging members 400a to 400d much more than necessary, so that the elastic force caused by deformation of the urging members 400a to 400d will be increased.

Further, because there is no receiving face in a vicinity of the opening of the masking component 204 in the y-direction, deformation of the opening in the y-direction will be increased.

Accordingly, as illustrated in FIG. 6B, the receiving faces 402a to 402d are provided at the positions of an angle of 30-degree or more from the x-axis in the coordinate system which takes the optical axis as 0.

Therefore, while taking a deformation balance in the x and y directions of the masking opening of the masking component 204 into consideration, the elastic force caused by deformation of the urging members 400a to 400d can be suppressed to a desired range.

A load caused by the first urging members 400 is greater than a weight of the first optical component 201 arranged at a position on a side closer to the object than the first masking component 204.

A purpose of the elastic force of the urging members 400a to 400d will be described below in detail.

Next, a holding method of the masking component 205 will be described in detail.

As illustrated in FIG. 3, receiving faces 215a to 215c provided on the optical component 202 receive the masking component 205 in the optical axis direction.

On the other hand, in a housed state, the masking component 205 and the optical component 203 are respectively in contact with convex portions 403a to 403c and 405a to 405c of the elastic member 208 illustrated in FIG. 11A or 11B.

The convex portions 403a to 403c are in contact with the third optical component 203, and the convex portions 405a to 405c are in contact with the masking component 205.

As illustrated in FIG. 5B, in the housed state, the second optical component 201 is held between the masking component 205 and the elastic member (third urging member) 208.

Therefore, positions of the optical component 203 and the masking component 205 are precisely fixed by the elastic force generated when the elastic member (third urging member) 208 is elastically deformed.

Therefore, when a user looks into a finder, a viewing angle and a field of view with less vignetting can be ensured stably.

<Load Relationship between Urging Members>

Next, with reference to FIGS. 12 to 16, loads of the urging members 400 arranged on the masking component 204 will be described in detail.

Figure 12:
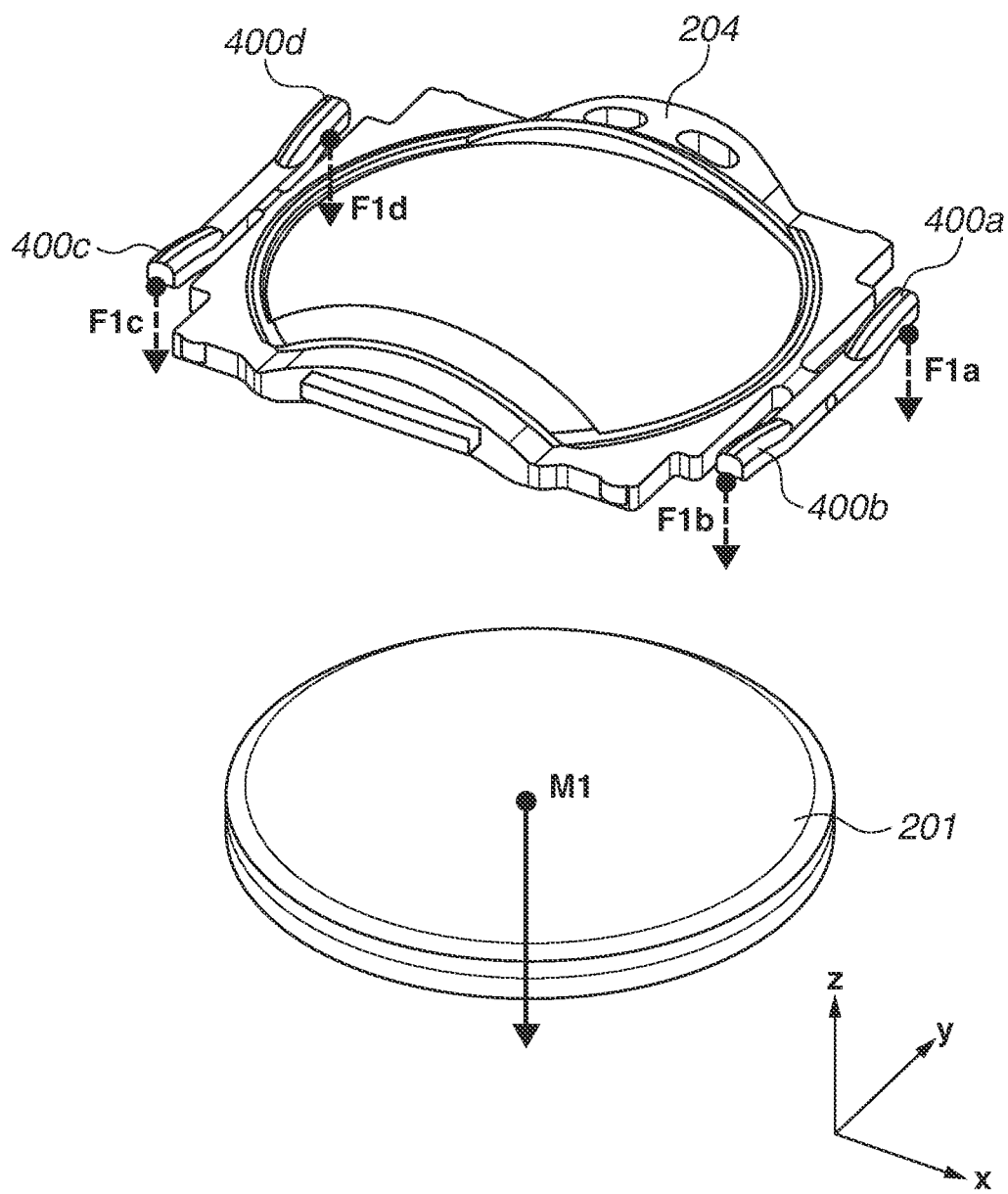
FIG. 12 is a diagram A illustrating a load relationship according to an exemplary embodiment of the present disclosure.

FIG. 12 is a diagram A illustrating a load relationship in the exemplary embodiment of the present disclosure.

Figure 13:
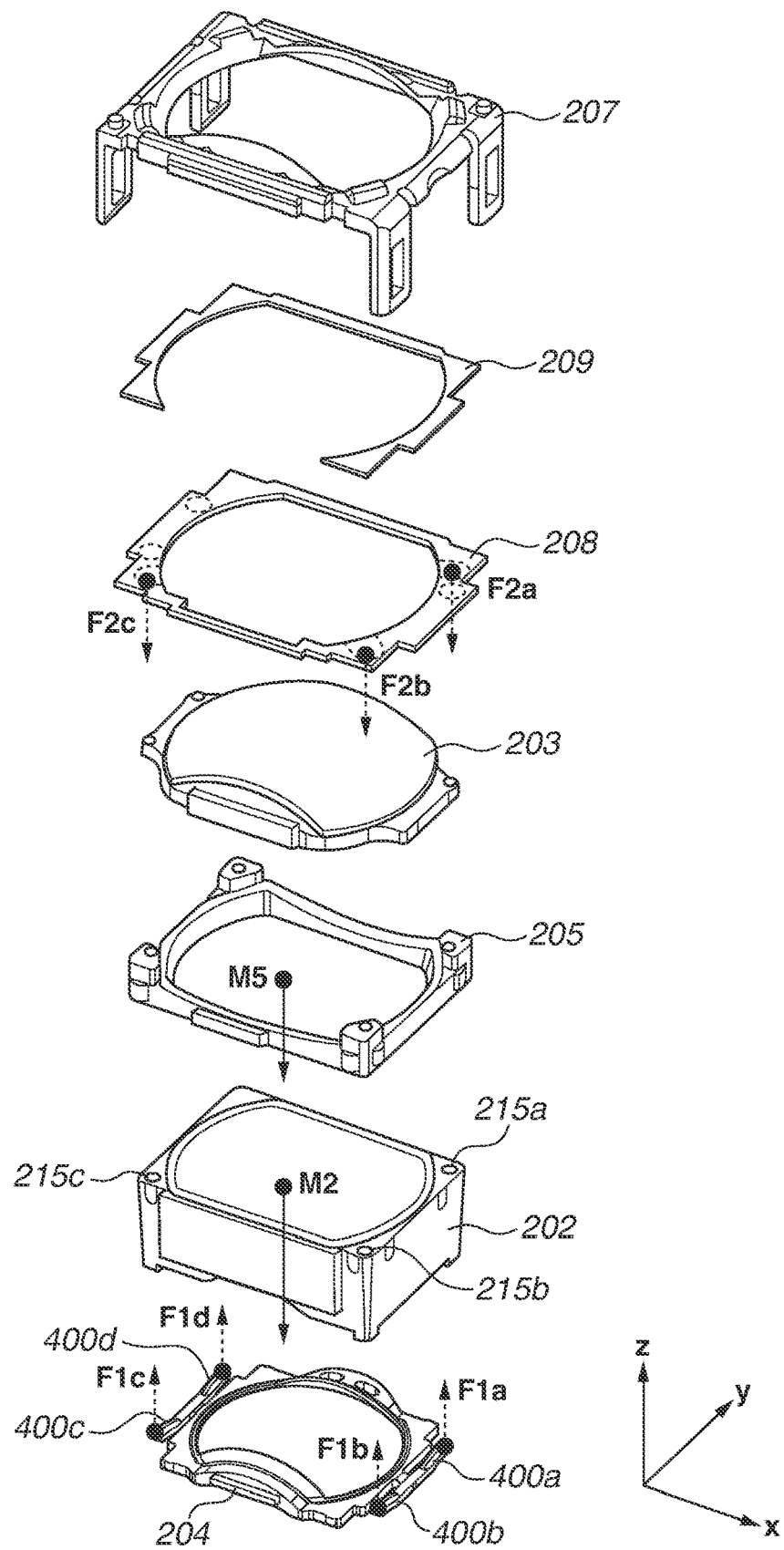
FIG. 13 is a diagram B illustrating a load relationship according to an exemplary embodiment of the present disclosure.

FIG. 13 is a diagram B illustrating a load relationship in the exemplary embodiment of the present disclosure.

Figure 14:
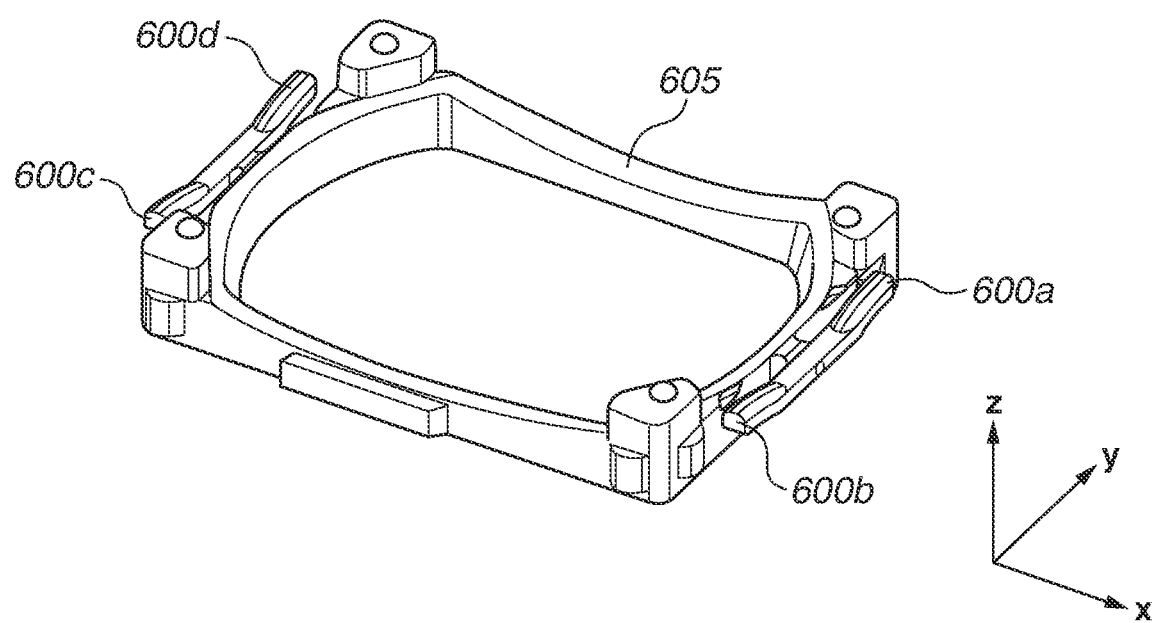
FIG. 14 is a perspective view illustrating a masking component and an urging member according to another exemplary embodiment of the present disclosure.

FIG. 14 is a perspective view illustrating a masking component 605 and an urging member 600 of a different exemplary embodiment of the present disclosure.

Figure 15:
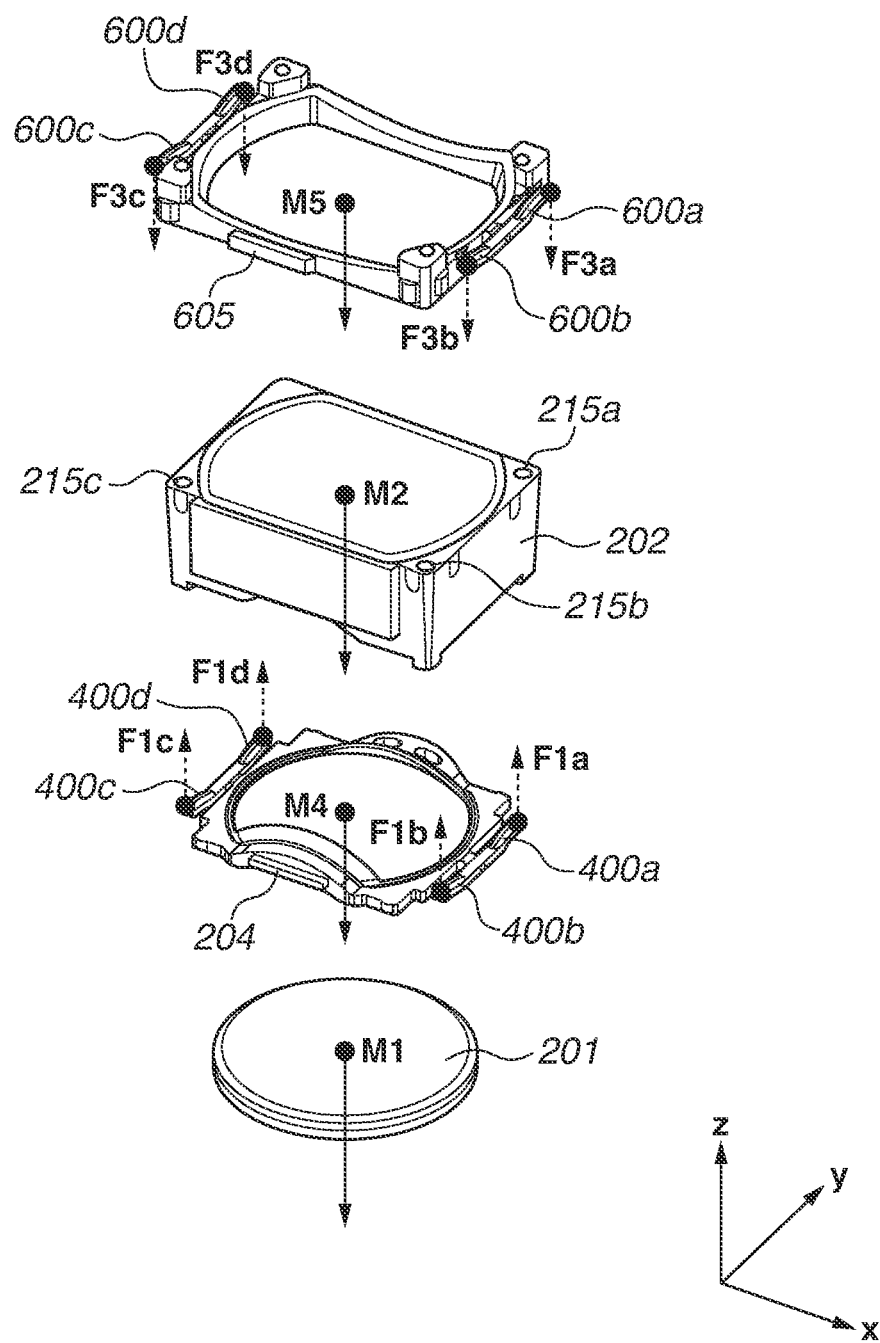
FIG. 15 is a diagram A illustrating a load relationship according to another exemplary embodiment of the present disclosure.

FIG. 15 is a diagram A illustrating a load relationship in the different exemplary embodiment of the present disclosure.

Figure 16:
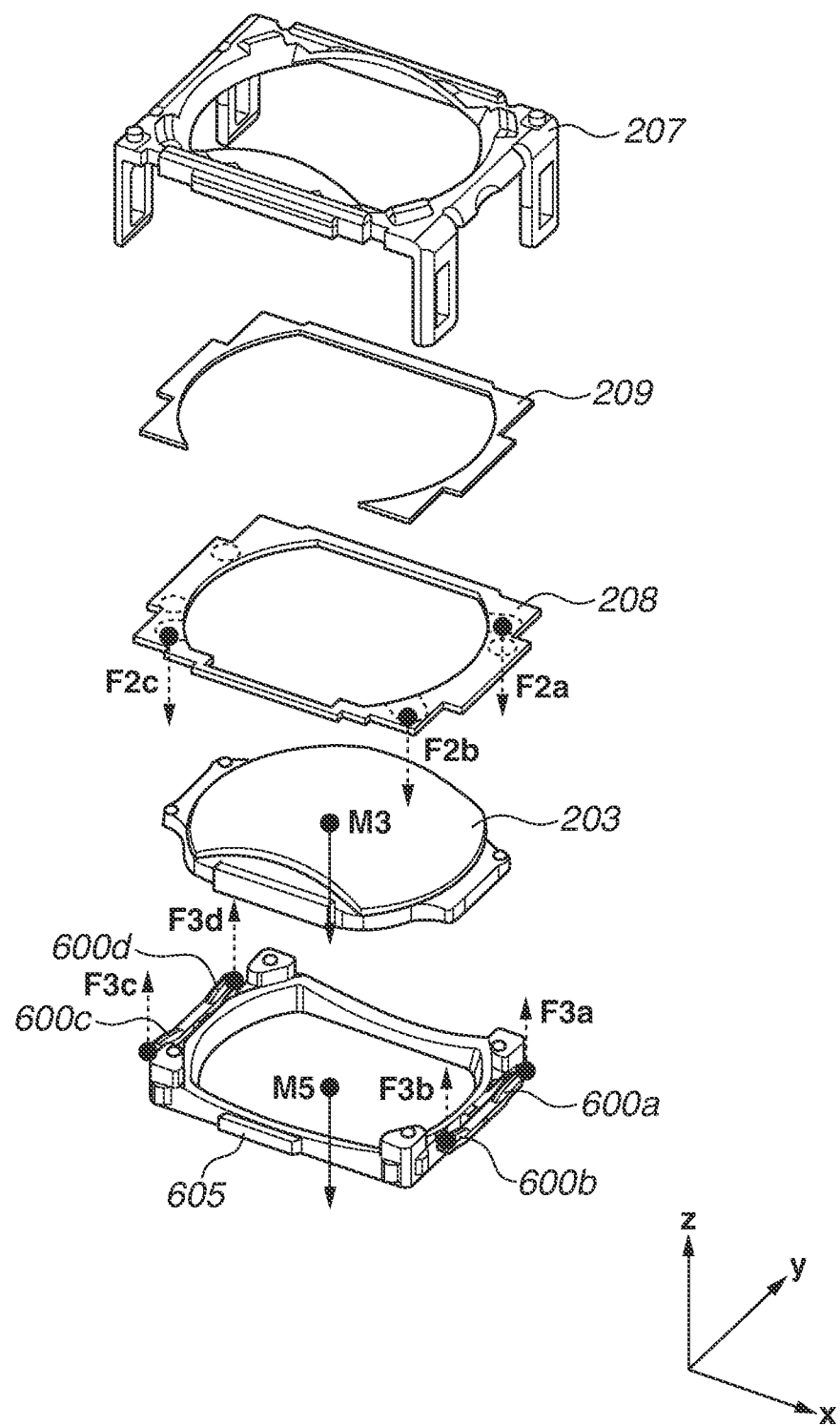
FIG. 16 a diagram B illustrating a load relationship according to another exemplary embodiment of the present disclosure.
Figure 17:
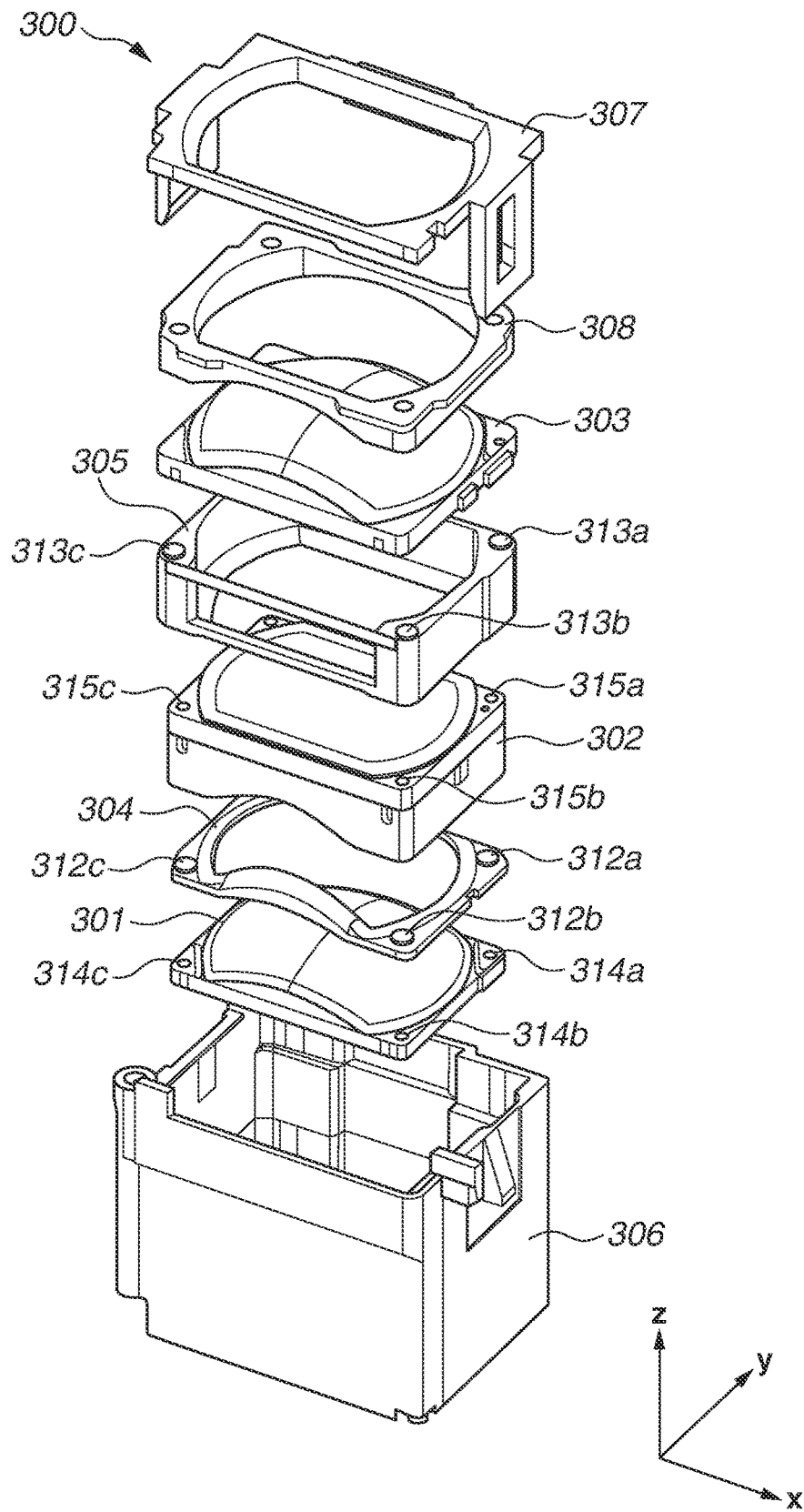
FIG. 17 is a perspective view illustrating an optical unit in a conventional example.
Figure 18:
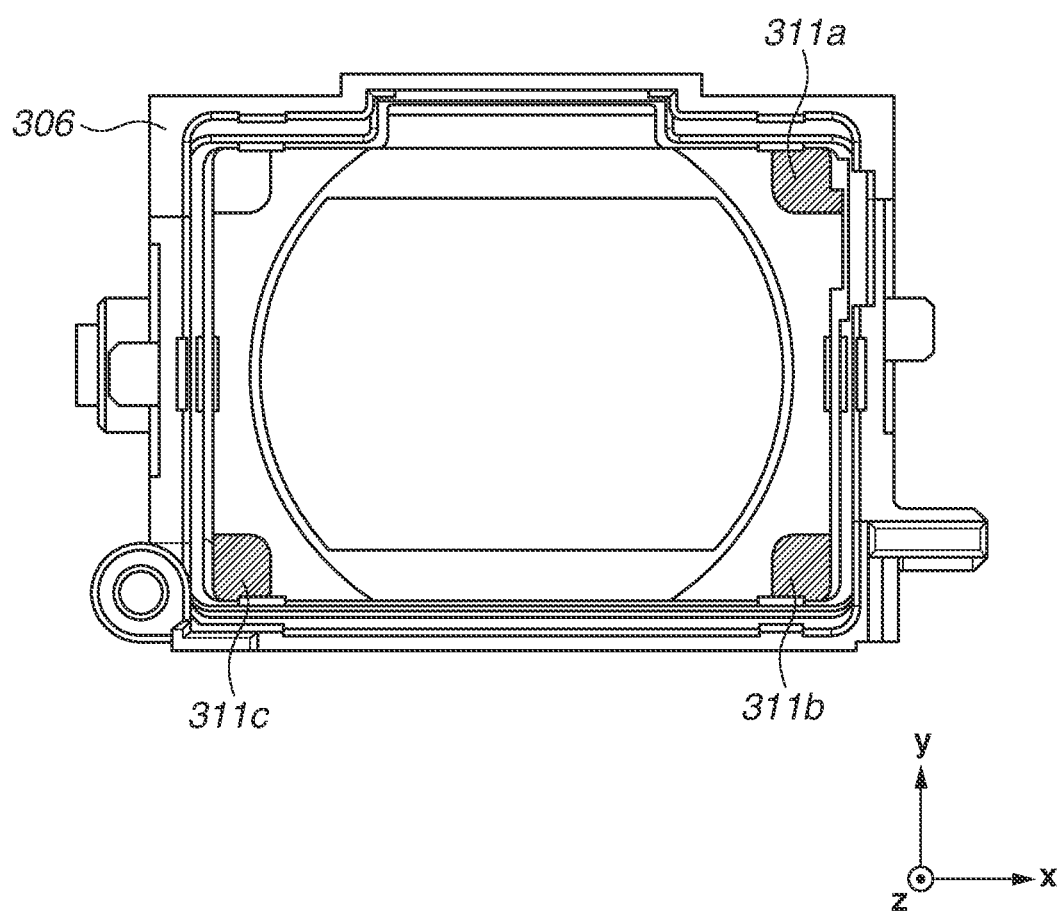
FIG. 18 is a front view illustrating a holding member of the first optical component in a conventional example.

FIG. 16 is a diagram B illustrating a load relationship in the different exemplary embodiment of the present disclosure.

In a state where the masking component 204 is housed in the eyepiece unit 200, the urging members 400a to 400d are elastically deformed by the weights of the optical component 202 and the other components, and a pressing force caused by the elastic member 208 which are not illustrated in FIG. 12.

Therefore, loads F1a to F1d illustrated in FIG. 12 are generated.

A resultant force of the loads F1a to F1d caused by the urging members 400a to 400d of the masking component 204 is expressed as "Fa".

At this time, it is preferable that a relationship between the resultant force Fa caused by the urging members 400 and a weight M1 of the optical component 201 arranged at a position on the inner side (hereinafter, referred to as "−z direction") of the masking component 204 be "Fa>M1".

This is because, in a case where the camera 100 is held in an orientation in which the +z direction in FIG. 12 is the gravitational direction, if the above-described relationship is "Fa<M1", the urging members 400 are deformed by the weight of the first optical component 201, and a position of the optical component 201 is moved.

Accordingly, in order to precisely fix a position of the optical component 201 regardless of the orientation of the camera 100, the load relationship has to be "Fa>M1".

In the present exemplary embodiment, the first optical component 201 is reliably held by the elastic force of the urging members 400.

However, if it is difficult to reliably hold the first optical component 201 with only the urging members 400 because of the other specifications or design conditions, the first optical component 201 may be adhered to the first optical component holding member 206.

In that case, in consideration of compatibility with the optical members, strength, or assembling efficiency an ultraviolet (UV) adhesive material is generally used.

Further, in a state where the masking component 204 is housed in the eyepiece unit 200, the elastic member 208 is in contact with the masking component 205 at the convex portions 405a to 405c, so that loads F2a to F2d illustrated in FIG. 13 are generated respectively.

A resultant force of the loads F2a to F2d caused by the convex portions 405a to 405c of the elastic member 208 is expressed as "Fb".

At this time, the masking component 204 is in contact with the optical component 202 at the leading ends of the urging members 400a to 400d.

Further, the masking component 205 is in contact with the receiving faces 215a to 215c of the optical component 202 in the optical axis direction.

Herein, it is preferable that the resultant force Fa of the urging members 400 and a total value of the weight M2 of the optical component 202 contacting the masking component 205, the weight M5 of the masking component 205, and the resultant force Fb of the elastic member 208 be in a relationship expressed as "Fa<M2+M5+Fb".

Hereinafter, a portion on the outer side of the masking component 204 is referred to as "+z direction".

This is because the urging members 400 push up the optical component 202 and the masking component 205 contacting the optical component 202 if the above relationship is "Fa>M2+M5+Fb".

Thus, the positions of the second optical component 202 and the second masking components 205 are moved.

Accordingly, in order to precisely fix the positions of the optical component 202 and the second masking component 205, the load relationship has to be "Fa<M2+M5+Fb".

At this time, as illustrated in FIG. 4, faces 213a to 213c for receiving the third optical component 203 in the optical axis direction are provided on the first optical component holding member 206, so that the third optical component 203 is sandwiched by the elastic member 208.

Therefore, a position of the third optical component 203 can be fixed precisely regardless of the resultant force Fa of the loads F1a to F1d.

Through the above-described configuration, the positions of the optical components 201 to 203 and the masking components 204 and 205 can be fixed precisely.

The load caused by the second urging members 600 is greater than a total value of the weights of the second optical component 202, the first masking component 204, and the first optical component 201, and a load caused by the first urging members 400 which are arranged at positions closer to the object than the second masking component 205.

Therefore, finder quality such as distortion arising in a finder image or a viewing angle when a user looks into the finder can be stably improved.

In the present exemplary embodiment, the urging members 400a to 400d are arranged on the masking component 204.

However, as the second masking component 605 illustrated in FIG. 16 shows, the urging members 600a to 600d may be also arranged on the above-described masking component 205.

A load relationship will be described with respect to the configuration including the urging members 600a to 600d.

In a state where the masking component 605 is housed in the eyepiece unit 200, the urging members 600a to 600d are elastically deformed by the pressing force caused by the optical component 203 and the elastic member 208 which are not illustrated in FIG. 15, and the loads F3a to F3d in FIG. 15 are generated respectively.

At this time, the resultant force Fc of the loads F3a to F3d and a total value of the weights M1 and M2 of the optical components 201 and 202 and the resultant force Fa of the masking component 204 and the urging members 400a to 400d which are arranged at positions in the −z direction from the masking component 605 satisfy the following relational expression.

The relational expression can be expressed as "Fc>M1+M2+M4+Fa".

This is because if the camera 100 is held in an orientation in which the +z direction in FIG. 15 is the gravitational direction, the relational expression is "Fc<M1+M2+M4+Fa". In that case, the urging members 600 are deformed by the weight of the respective components and the resultant force Fa, and the positions of the optical components 201 and 202 are moved.

Accordingly, in order to precisely fix the positions of the optical components 201 and 202 regardless of the orientation of the camera 100, the load relationship has to be "Fc>M1+M2+M4+Fa".

Further, in a state where the masking component 605 is housed in the eyepiece unit 200, the elastic member 208 is in contact with the masking component 605 at the convex portions 405a to 405c, so that loads F3a to F3d illustrated in FIG. 15 are generated respectively.

Further, the leading ends of the urging members 600a to 600d of the masking component 605 are in contact with the optical component 203.

At this time, it is preferable that the resultant force Fc of the loads F3a to F3d and a total value of the weight M3 of the optical component 203 contacting the masking component 605 and the resultant force Fb of the loads F2a to F2d caused by the elastic member 208 which are positioned in the +z direction from the masking component 605, be in a relationship expressed as "Fc<M3+Fb".

This is because the urging members 600 push up the optical component 203 to move a position of the optical component 203 if the above relationship is "Fc>M3+Fb".

Accordingly, the load relationship has to be "Fc<M3+Fb" in order to precisely fix a position of the optical component 203.

A load caused by the second urging members 600 of the second masking component 605 is smaller than a total value of the weight of the third optical component 203 and a load caused by the third urging member 208 which are arranged at positions on one side of the second masking component 205 which is opposite to the object.

While in the present exemplary embodiment, a configuration including two masking components has been described, the same effect can be acquired if the number of masking components is three or more.

Further, a configuration in which the urging members 400 are arranged on only the masking component 204 and a configuration in which the urging members 400 and 600 are respectively arranged on both of the masking components 204 and 605 have been described.

However, the urging members 600 may also be arranged on only the masking component 605.

As described above, according to an aspect of the present disclosure, in holding the optical components, it is possible to provide an optical component holding device configured to highly precisely hold the optical components and the masking components in a limited space with a simple configuration.

while the exemplary embodiments of the present disclosure have been described as the above, the disclosure invention is not limited to the above-described exemplary embodiments, and many variations and modifications are possible within the scope of the present disclosure.

According to an aspect of the present disclosure, in holding the optical components, it is possible to provide an optical component holding device configured to highly precisely hold the optical components and the masking components in a limited space with a simple configuration.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-056925, filed Mar. 23, 2018, which is hereby incorporated by reference herein in its entirety.

What is claimed is:

1. A holding device comprising:
   a first optical component which holds a first lens;
   a second optical component which holds a second lens;
   a first elastic member arranged at a position between the first optical component and the second optical component in an optical axis direction;
   a first holding member; and
   a second holding member,
   wherein the first holding member and the second holding member press and hold the first optical component, the first elastic member, and the second optical component in the optical axis direction, and
   wherein the first holding member includes,
      a first receiving face that is in contact with the first optical component in the optical axis direction to fix a position of the first optical component in the optical axis direction, and
      a second receiving face that is in contact with the second optical component in the optical axis direction to fix a position of the second optical component in the optical axis direction.

2. The holding device according to claim 1,
   wherein a first masking which sets a diameter of a light flux is arranged at a position between the first optical component and the second optical component in the optical axis direction,
   wherein a second masking which sets a diameter of the light flux is arranged at a position on one side of the second optical component which is opposite to an object in the optical axis direction,
   wherein a third optical component which holds a third lens is arranged at a position on one side of the second masking which is opposite to an object in the optical axis direction,
   wherein the second masking includes a second urging member that is in contact with the third optical component and the second optical component to urge the third optical component and the second optical component in the optical axis direction,
   wherein the first holding member and the second holding member hold the first optical component, the first masking, the second optical component, the second masking, and the third optical component in between, and press and hold the first optical component, the first masking, the second optical component, the second masking, and the third optical component in the optical axis direction, and
   wherein the first holding member includes a third receiving face that is in contact with the third optical component to fix a position of the third optical component in the optical axis direction.

3. The holding device according to claim 1,
   wherein the first masking has a rectangular-shaped outer circumferential rim,
   wherein the first urging member is arranged on a shorter side of the rectangular-shaped outer circumferential rim of the first masking,
   wherein the second masking has a rectangular-shaped outer circumferential rim, and
   wherein the second urging member is arranged on a shorter side of the rectangular-shaped outer circumferential rim of the second masking.

4. The holding device according to claim 1, wherein a load caused by the first urgent member of the first masking is greater than a weight of the first optical component which is arranged at a position closer to an object than the first masking.

5. The holding device according to claim 1, wherein a load caused by the second urging member of the second masking is greater than a total value of weights of the second optical component, the first masking, and the first optical component and the load caused by the first urging member of the first masking which are arranged at a position closer to an object than the second masking.

6. The holding device according to claim 1,
wherein a third urging member is arranged at a position between the second holding member and the third optical component, and
wherein the load caused by the first urging member of the first masking is smaller than a total value of weights of the second optical component, the third optical component, the second masking, and a load caused by the third urging member which are arranged at positions on one side of the first masking which is opposite to an object.

7. The holding device according to claim 1, wherein the load caused by the second urging member of the second masking is smaller than a total value of a weight of the third optical component and a load caused by the third urging member which are arranged at positions on one side of the second masking which is opposite to an object.

8. The holding device according to claim 3, wherein the first urging member of the first masking extends in a direction of a shorter side of a field of view of a finder and includes a receiving face provided at a base portion of the first urging member, where the first optical component is in contact with the first masking.

9. The holding device according to claim 8, wherein the first masking includes a plurality of receiving faces contacting the first optical component, each of which is positioned at an angle of 30-degree or more with an axis set in a direction of a longer side of a field of view of the finder as a reference.

10. The holding device according to claim 1, wherein the holding device is an eye piece unit that adjusts a diopter of an optical image.

11. An imaging apparatus comprising:
a holding device including,
a first optical component which holds a first lens;
a second optical component which holds a second lens;
a first elastic member arranged at a position between the first optical component and the second optical component in an optical axis direction;
a first holding member;
a second holding member,
wherein the first holding member and the second holding member press and hold the first optical component, the first elastic member, and the second optical component in the optical axis direction,
wherein the first holding member includes,
a first receiving face that is in contact with the first optical component in the optical axis direction to fix a position of the first optical component in the optical axis direction, and
a second receiving face that is in contact with the second optical component in the optical axis direction to fix a position of the second optical component in the optical axis direction, and
wherein the holding device is an eye piece unit that adjusts a diopter of an optical image; and
an image sensor.

* * * * *